Patented May 14, 1929.

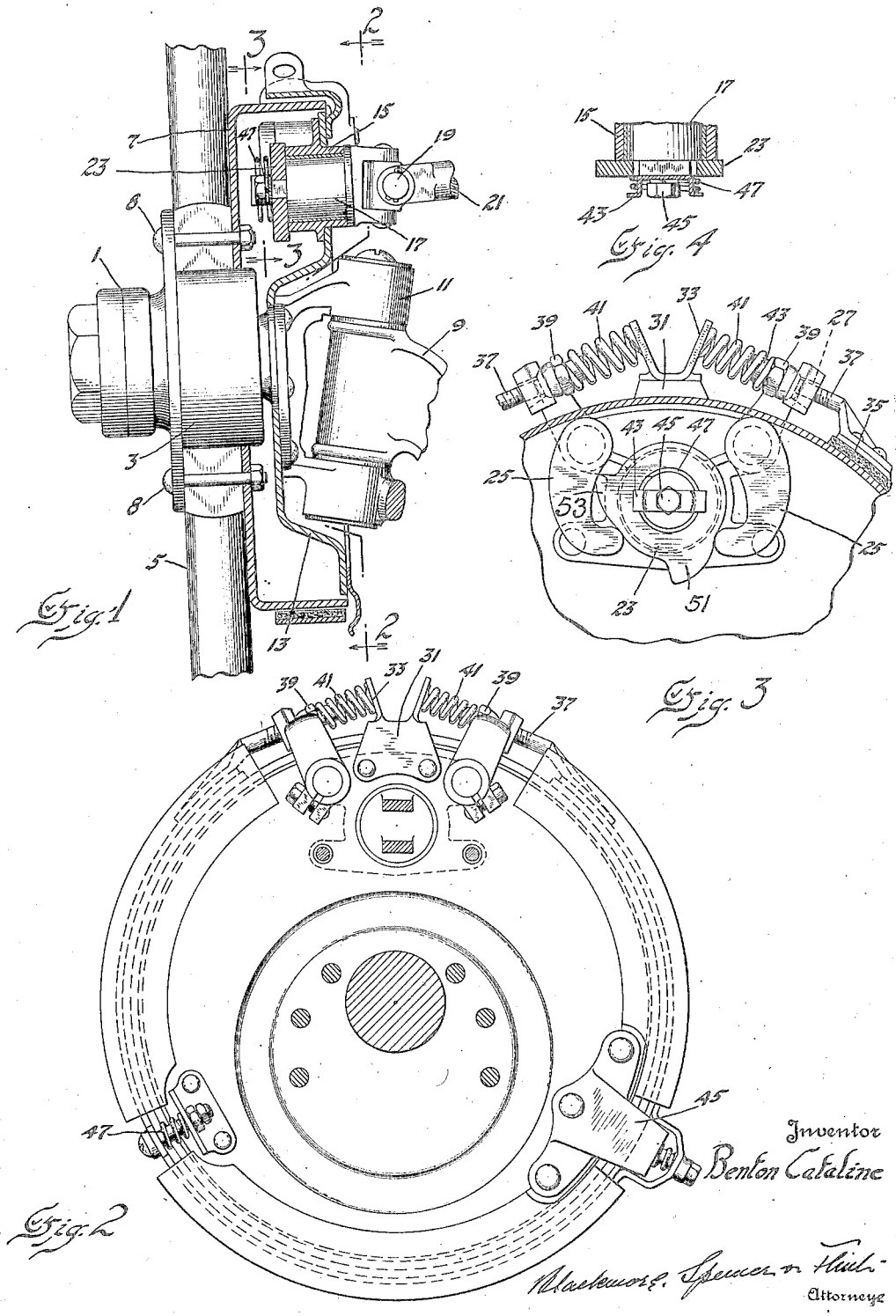

1,712,949

UNITED STATES PATENT OFFICE.

BENTON CATALINE, OF FLINT, MICHIGAN, ASSIGNOR TO GENERAL MOTORS CORPORATION, OF DETROIT, MICHIGAN, A CORPORATION OF DELAWARE.

BRAKE LAYOUT.

Application filed June 11, 1926. Serial No. 115,291.

This invention relates to brakes and is more particularly intended for use with the wheels of motor vehicles.

An object of the invention is to provide a brake operating cam which will accommodate itself to different lengths of bands, wear of the brake linings, variations in manufacture and the like.

A further object consists in an arrangement of parts designed to apply equally the brake sections in the case where the brake anchor is off-center.

Another object is to so locate the operating mechanism that it may be free from dirt and from injury.

Other objects will be obvious upon reading of the following description.

In the drawing:

Figure 1 is a vertical section through a front wheel with my novel brake applied.

Figure 2 is a section on line 2—2 of Figure 1.

Figure 3 is a section on line 3—3 of Figure 1.

Figure 4 shows a detail in section.

Referring to the drawing by reference characters, numeral 1 represents a front wheel of a motor vehicle having a hub 3 and spokes 5. Secured to the inner side of the wheel is a brake drum 7, bolts 8 conveniently affording the means of attachment. The wheel axle is mounted for swinging movement relative to the vehicle axle 9 by means of yoke members 11. Secured rigidly to the stub axle is a cover plate 13. Passing through this cover plate above the pivotal connection is a bearing member 15 within which is rotatably mounted a shaft 17 connected by a universal joint 19 with a shaft 21. This shaft 21 is rocked by any convenient mechanism in the actuation of the brake.

Carried upon the end of shaft 17 is a cam 23. Journalled in the cover plate 13 on either side of the shaft 17 are levers 25. The ends of these levers are so related to the cam 23 that they are both swung simultaneously about their pivots when the cam is rotated. From Figure 3 it will be seen that upper ends of these levers extend above the cover plate 13. From Figure 1 it will be observed that the extremities of the levers are carried partly across the outer face of the drum, where they are provided with apertures 27. Attached to the cover plate 13 at its top is a plate 31 equipped with two diagonally positioned abutments 33. The brake band is represented by numeral 35. Its two ends are provided with inwardly directed threaded members 37. These members 37 extend through the openings 27 where they are provided with nuts 39. The nuts 39 engage the outer ends of the levers. Coil springs 41 are positioned between the abutments 33 and the nuts 39, suitable positioning means 43 being housed within the coil springs.

The usual spring anchor 45 is shown in Figure 3, also the band releasing spring 47, as to which no invention is being claimed.

The position of anchor 45 is, it will be observed, at one side of the center of the band. To compensate for this off-center position the cam is shaped in such a way that the one lever 25, which contracts the longer band section, swings more than the other lever. To this end the cam 23 is formed with two radially unequal cam portions 51 and 53. The longer cam portion, 51, is associated with the lever 25 which is itself related to the longer portion of the brake band. As a result of this construction, when the camshaft and cam are rotated in a counter-clockwise direction (Figure 3) the longer cam 51 turns its lever 25 to a somewhat greater extent than the shorter cam portion 53 turns its lever. As a result the difference in length between the two portions of the external band brake means is compensated for as both parts of the band are drawn into engagement with the drum when the camshaft is rotated.

Also, the mounting of the cam on its pivot is to be noted. The cam is made with a slot of rectangular shape of greater length than the length of the projecting reduced end of shaft 17 over which it is received. A limited longitudinal movement is thus given the cam enabling it to act as an equalizer between the two ends of the band to secure an equal application of the applied forces to the two ends of the band. For the purpose of holding the cam on its shaft a washer 43 is used. This washer is held beneath nut 45 and against the end of the shaft. Under the up-turned ends of the washer is a coil spring 47 engaging the cam and holding it in position on the shaft.

The operation of the device, it is believed, will be clear from the above description. When the shaft 21 is rocked to turn the cam 23, the levers 25 are swung upon their pivots, thus drawing the ends of the brake band 35 upon the drum. When the band is released springs 41 ensure the return of the levers 25 and the dis-engagement of the brake band from the brake drum. The adjustment of nut 39 upon the threads of member 37 affords an independent adjustment for each end of the band.

By means of the sliding movement of the cam on the shaft the unequal wear of the linings does not interfere with the equal application of the brake band. Furthermore, the shape of the cam is such as to compensate for the off-center position of the braking anchor.

I claim:

1. In a brake operating mechanism, a brake band, an eccentric anchor therefor, a pair of levers connected each to one end of the band, a cam for swinging said levers in opposite directions, the cam being asymmetrically shaped to counteract the effect of the eccentricity of the band anchor.

2. In a brake operating mechanism, a drum, a cover plate, a contracting band external to the drum, an eccentric anchor for said band, shafts journalled in the cover plate, arms on the shaft outside said plate and engaging said band to contract the same on the drum, arms secured to said shaft and positioned within the drum, actuating means for said arms within said drum, said actuating means consisting of a cam and a shaft therefor extending through said cover plate, said shaft having two relatively asymmetrical cam portions.

3. In a brake, a drum, brake means for engaging the drum, an operating shaft, a cam having a slot of a size such as to permit the cam moving on the shaft, a member secured to said shaft and resilient means between said member and cam to hold said cam on the shaft.

In testimony whereof I affix my signature.

BENTON CATALINE.